No. 814,976. PATENTED MAR. 13, 1906.
G. MEHRING.
STEAM PIPE THIMBLE.
APPLICATION FILED JUNE 29, 1904.
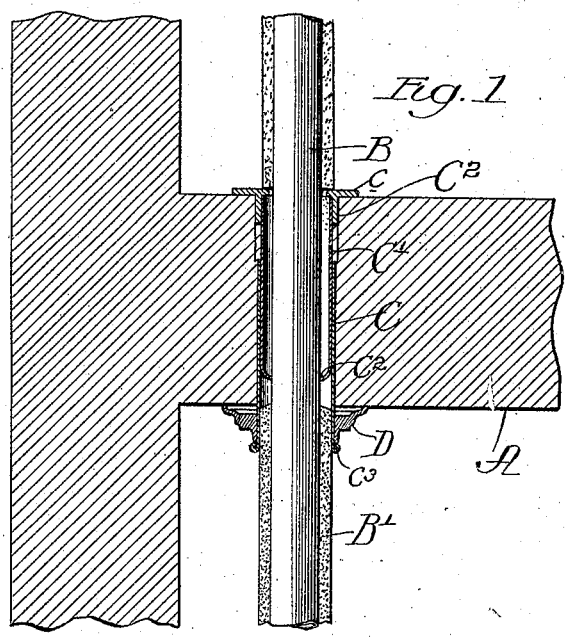
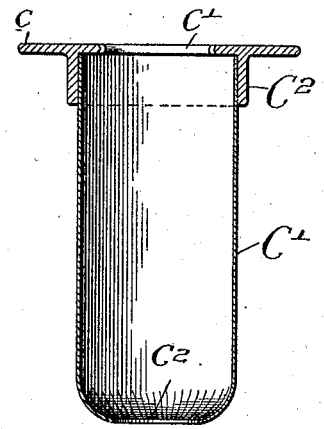
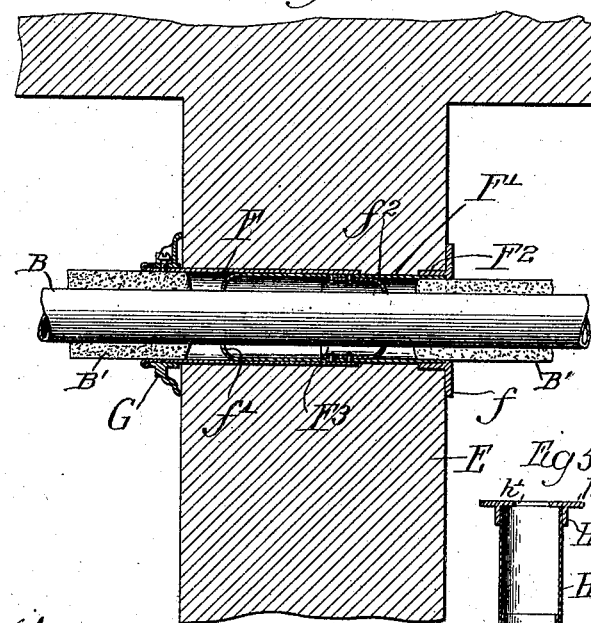
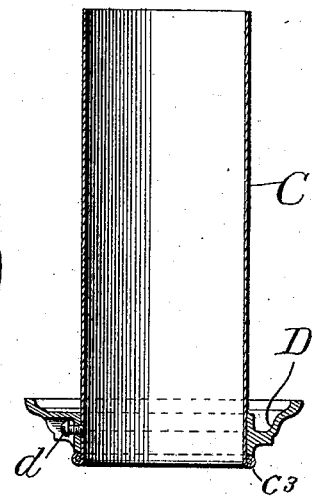
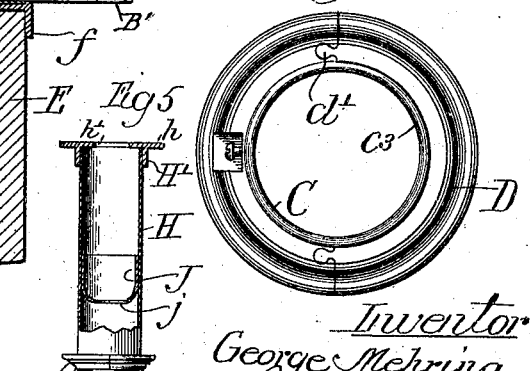
Witnesses:
Inventor.
George Mehring
by Fowler Brown his Attys

UNITED STATES PATENT OFFICE.

GEORGE MEHRING, OF CHICAGO, ILLINOIS.

STEAM-PIPE THIMBLE.

No. 814,976. Specification of Letters Patent. Patented March 13, 1906.

Application filed June 29, 1904. Serial No. 214,604.

*To all whom it may concern:*

Be it known that I, GEORGE MEHRING, a citizen of the United States, and a resident of Chicago, in the county of Cook and State of Illinois, have invented certain new and useful Improvements in Steam-Pipe Thimbles; and I do hereby declare that the following is a full, clear, and exact description thereof, reference being had to the accompanying drawings, and to the letters of reference marked thereon, which form a part of this specification.

This invention relates to improvements in pipe-thimbles for insulated steam-pipes for inclosing that portion of a pipe which extends through a wall or ceiling; and the invention consists in the matters hereinafter set forth and more particularly pointed out in the appended claims.

In the drawings, Figure 1 is a vertical section of my improved pipe-thimble, showing the manner of fitting the same in a wall and of fitting the pipe therein. Fig. 2 is an enlarged view of the two parts constituting the thimble shown in Fig. 1. Fig. 3 is a bottom plan view of the lower section of the thimble shown in Fig. 2. Fig. 4 illustrates a modification of the thimble fitted to an opening in a vertical wall. Fig. 5 shows a still further modification of the thimble.

A thimble made in accordance with my invention embraces in general terms a suitable tube adapted to be fitted in an opening in a wall through which the pipe extends and made in some instances of two tube-sections, which have telescopic connection. The thimble is provided with inwardly-directed flanges, at least one of which is located within the tube, which fit closely about the pipe and hold the pipe centrally in the tube. Such tube is made sufficiently large at its end to receive the insulating layer which surrounds or invests the pipe, whereby said insulating layer may freely move into and out of the space surrounding the pipe without changing its relation to the pipe or becoming jammed.

As shown in Figs. 1 and 2 of the drawings, A designates a fragment of a ceiling provided with an opening through which extends a steam or other pipe B. Said pipe is surrounded by or invested with an insulating-covering B', made of asbestos or like material. The thimble shown in said Figs. 1 and 2 comprises two tubular sections C C', made, preferably, of sheet metal and which are fitted into said opening. The tubular section C is open at both ends and is made of such size as to receive the section C'. The section C' is provided at its outer end with a cast-metal ring $C^2$, which surrounds said section and is fixed rigidly thereto. Said ring is provided with a flange $c$, which extends radially outwardly beyond the ring and fits the wall A around the opening therein, and is provided also with an annular flange $c'$, that extends radially inwardly beyond the wall of the tube and is adapted to closely fit the pipe B in its uncovered part. The inner end of said section C' is contracted to form a flange $c^2$, the opening in which is made of the same size as the opening in the flange $c'$. The openings in the flanges $c'$ $c^2$ constitute guides which hold the pipe B in proper alinement and centrally in the thimble. The outer end of the section C projects a distance from the wall A, and said extension is surrounded by a flanged ornamental collar D, which fits against the adjacent surface of the wall or ceiling around the opening therein. Said collar is fastened to the section C by means of a screw $d$, that extends through the cylindric wall of the collar and impinges against the outer cylindric surface of the tubular section C. Preferably the outer end of the tubular section is provided with a rolled rim $c^3$, affording an annular shoulder or stop against which the outermost margin of said collar bears. Said collar D is made of two parts in order to facilitate the fitting of tne same on the section C, one part being provided at its ends with tongues $d'$, which interlock with grooves in the corresponding ends of the other part, as indicated in Fig. 3. The telescopic construction of the thimble enables the same to be readily adjusted to walls of varying thickness.

The outer end of the section C beyond the flange $c^2$ of the section C' is made of sufficient internal diameter to receive the insulating layer B' of the pipe B. The provision of the space thus formed in the end of the section C to receive said insulating layer B' permits endwise movement of said insulating layer with the pipe during expansion and contraction of said pipe without tendency of the insulation shifting relatively to the pipe or being crushed by reason of its being thrust against the face of the wall around the opening therein or a collar surrounding the pipe at the end of said opening. It is well known that the steam-pipes comprising parts of heating systems of tall buildings expand and contract through comparatively wide ranges during the use thereof, and it is desirable that provision be made to prevent such endwise shifting of the pipes from destroying or marring the joints between the pipes and the walls through which they extend. Such movement of the pipes, together with the insulating layers investing the same, is permitted by the construction herein shown without injury to the insulation or affecting the relation of the insulation to the pipes. Heretofore it has been a common practice to employ thimbles of this character of a diameter but slightly greater than the pipes, and to fit the ends of the insulating layers in abutting relation to the walls or parts surrounding the pipes at the ends of the openings therein. In such construction in the event of substantial expansion of the pipes the said insulating layers, not being capable of movement relatively to the walls, tend to slip or shift on the pipes and to bulge outwardly by reason of the pressure due to such movement, and thereby injure and mar the appearance of the joints between the pipes and walls.

The construction shown in Fig. 1 is adapted more especially for use in connection with steam-pipes, which are anchored at their lower ends and which shift upwardly during expansion thereof. In case the pipes be so anchored that they shift downwardly during expansion the position of the thimble is reversed—that is to say, the larger end of the thimble is directed upwardly to receive the insulating layer and to permit it to shift downwardly thereinto during expansion of the pipes. The upper end of the thimble (shown in Fig. 1) or the lower end of a thimble associated with a downwardly-expanding pipe need not necessarily be made to receive the insulating-covering, inasmuch as there is no tendency of such covering becoming jammed during expansion and contraction of the pipe.

In Fig. 4 is shown a form of thimble which receives at both ends thereof the insulating-covering of the pipe. Said thimble is shown in connection with a horizontal pipe extending through an opening in a vertical wall E, though this form of thimble may be employed in a horizontal wall, if desired. The thimble consists of two telescopic sections F F', the section F corresponding to the section C, before described, and the section F' corresponding generally to the section C'. $F^2$ designates a ring at the outer end of the section F', and said ring is provided with a flange $f$, that fits against the wall around the opening therein. The ring is made large enough to receive the insulating-covering of the pipe. The opposite end of the other section F extends beyond the wall, as herein shown, and is provided with an ornamental flanged collar G, corresponding in function and appearance to the collar D, before described. Said outer end of the section F is made of a diameter to receive the insulating layer B', as does the like section C. (Shown in Fig. 1.) The section F' is contracted at its inner end to form an inwardly-extending flange $f'$, corresponding to the flange $c^2$ of the section C' of the previously-described construction. In order to provide an additional guide for the pipe within the thimble, (and which corresponds in function to the flange $c'$ of the previously-described construction,) a short tube $F^3$ is fixed within the smaller section F' and is contracted at one end to form a flange $f^2$, the opening of which is of the same diameter as the opening in the flange $f'$. Said flanges $f'$ $f^2$, therefore, constitute longitudinally-separated guides, which hold the pipe centrally within the thimble and permit the endwise movement of the pipe therein without any tendency of derangement of the pipe in the thimble.

Instead of the telescopic construction of the thimble shown in the two forms described I may employ a thimble made of a single inextensible tube, such as is shown in Fig. 5. The thimble shown in said Fig. 5 consists of a tube H, which is open at both ends and is provided at one end with a ring H', like the ring $C^2$ of the construction shown in Figs. 1 and 2, which fits over one end of the pipe and is provided with a flange $h$, that fits flat against the wall around the opening, and with a flange $h'$, which is adapted to closely surround the pipe. The other end of said tube is provided with a collar I, having the general form and function of the collars D and G of the previously described constructions. Fixed within the tube adjacent to the collar end is a short tube or shell J, which is contracted at its lower end to constitute a guide-flange $j$, through which the pipe B is adapted to extend. The said tube H is made sufficiently large at its end surrounded by the collar I to receive the insulating-covering of the pipe B in the same manner as shown at the lower end of the thimble in Fig. 1.

I claim as my invention—

1. A thimble for insulated pipes comprising a tube open at both ends, the opening at one end thereof being made of the full diameter of the tube, the opening at the other end being made of smaller diameter, and a flange located within and between the ends of the tube and formed with an opening in line with and of the same diameter as the smaller end opening of the tube.

2. A thimble for insulating-pipes comprising a two-part tube, one part of which is made shorter than and fits within the other, the inclosed or shorter part being turned inwardly at its inner end to form an opening of less diameter than the end opening of the larger or inclosing part.

3. A thimble for insulated pipes comprising a two-part tube, one part of which is made shorter than and fits within the other, the shorter or inclosed part being flanged inwardly at both ends to form alined openings of less diameter than the end opening of the inclosing tube.

4. A thimble for insulated pipes comprising a two-part tube, one part of which is made shorter than and fits within the other, the shorter or inclosed part being flanged inwardly at both ends to form alined openings of less diameter than the end opening of the inclosing tube, and said inclosed part being also provided at its outer end with a radial flange which limits its entrance in the inclosing part.

5. The combination with a pipe provided with an insulating-covering, of a thimble through which the pipe extends comprising a tube made of sufficient diameter at one end to receive said insulating-covering and a flange between the ends of the tube having an opening within which the uncovered part of the pipe closely fits.

6. The combination with a pipe provided with an insulating-covering, of a thimble through which the pipe extends comprising a two-part tube, one part of which is made shorter than and fits within the other, the outer or inclosing part of said tube being made of a diameter to receive the insulating-cover of the pipe, and the shorter or inclosed part thereof being flanged to provide an opening which closely fits the uncovered part of the pipe.

In testimony that I claim the foregoing as my invention I affix my signature, in presence of two witnesses, this 14th day of June, A. D. 1904.

GEORGE MEHRING.

Witnesses:
WILLIAM L. HALL,
GERTRUDE BRYCE.